United States Patent
Lee et al.

(10) Patent No.: US 9,532,397 B2
(45) Date of Patent: Dec. 27, 2016

(54) METHOD FOR PROVIDING COMMUNICATION SERVICE AND ELECTRONIC DEVICE THEREOF

(71) Applicant: Samsung Electronics Co., Ltd., Gyeonggi-do (KR)

(72) Inventors: Doo-Hwan Lee, Gyeonggi-do (KR); Tae-Young Oh, Gyeonggi-do (KR); Il-Pyo Hong, Gyeonggi-do (KR); Seong-Won Son, Gyeonggi-do (KR); Tae-Sin Song, Gyeonngi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/633,483

(22) Filed: Feb. 27, 2015

(65) Prior Publication Data

US 2015/0250020 A1    Sep. 3, 2015

(30) Foreign Application Priority Data

Feb. 28, 2014  (KR) .................. 10-2014-0024463

(51) Int. Cl.
  *H04W 88/06*  (2009.01)
  *H04B 7/06*   (2006.01)
  *H04W 36/00*  (2009.01)
(52) U.S. Cl.
  CPC .............. *H04W 88/06* (2013.01); *H04B 7/06* (2013.01); *H04W 36/0022* (2013.01)
(58) Field of Classification Search
  CPC ...... H04B 7/06; H04W 36/0022; H04W 88/06
  See application file for complete search history.

(56) References Cited

U.S. PATENT DOCUMENTS

| | | | |
|---|---|---|---|
| 2010/0296419 A1 | 11/2010 | Kim et al. | |
| 2013/0005392 A1* | 1/2013 | Chen ................... | H04B 1/0057 455/550.1 |
| 2013/0148636 A1 | 6/2013 | Lum et al. | |
| 2013/0308608 A1* | 11/2013 | Hu ....................... | H04B 7/0608 370/334 |
| 2014/0105416 A1* | 4/2014 | Huttunen .............. | H04R 5/027 381/92 |
| 2014/0334620 A1* | 11/2014 | Yemdji ................ | G10L 21/0232 379/406.08 |

(Continued)

FOREIGN PATENT DOCUMENTS

WO    2013/150171 A1    10/2013

OTHER PUBLICATIONS

"Introducing SV-LTE Indicator into LTE"; 3GPP TSG-RAN WG2 Meeting #75bis; Oct. 10-14, 2011; Zhuhai, china; VIA Telecom.

*Primary Examiner* — Kashif Siddiqui
(74) *Attorney, Agent, or Firm* — Cha & Reiter, LLC

(57) ABSTRACT

An apparatus and method for providing an LTE service in an electronic device. The method includes: transmitting or receiving a voice signal through a first antenna and a data signal through a second antenna when the electronic device provides a multi-communication service. At least one switch connects at least one antenna and at least one communication interface with each other. When the electronic device provides a single communication service, transmitting or receiving a data signal or a voice signal through the first antenna, using the at least one switch.

18 Claims, 16 Drawing Sheets

(56) References Cited

U.S. PATENT DOCUMENTS

2015/0162939 A1* 6/2015 Tchvertkin ........... H04B 1/0064
   455/553.1
2015/0215857 A1* 7/2015 Lee ....................... H04W 48/16
   370/280

* cited by examiner

METHOD FOR PROVIDING COMMUNICATION SERVICE AND ELECTRONIC DEVICE THEREOF

CLAIM OF PRIORITY

This application claims priority under 35 U.S.C. §119(a) from Korean Application Serial No. 10-2014-0024463, which was filed in the Korean Intellectual Property Office on Feb. 28, 2014, the entire content of which is hereby incorporated by reference in its entirety.

BACKGROUND

1. Field of the Disclosure

Various embodiments of the present disclosure relate to an electronic device, and more particularly, to an apparatus and a method for providing a Long Term Evolution (LTE) service by an electronic device.

2. Description of the Related Art

An electronic device that provides an LTE service may support multi-mode communication in a single radio environment.

For example, in the case of a single radio environment, an electronic device can transmit or receive a signal to/from one communication system among a plurality of communication systems which the electronic device can support according to the multi-mode communication. In other words, the electronic device is unable to simultaneously transmit or receive signals through a plurality of communication systems in the single radio environment.

In the case of supporting a multi-mode communication in the single radio environment, the electronic device may operate in a Circuit Switched FallBack (CSFB) scheme. In the case of being unable to support a voice service through an LTE communication system, an electronic device supporting the CSFB scheme may provide a data service through an LTE system and support a voice service using a Circuit Switching (SC) network.

SUMMARY

In the case of supporting a multi-mode communication in a single radio environment, the electronic device is unable to simultaneously transmit or receive signals through a plurality of communication systems. In the case of being unable to support a voice service through an LTE communication system, the electronic device is unable to provide a data service through an LTE system while providing a voice service using a SC network, which may result in the reduction in the availability of the LTE communication system.

Various embodiments of the present disclosure provide an apparatus and a method for improving the availability of an LTE communication system by an electronic device.

Various embodiments of the present disclosure directed to an apparatus and a method for incessantly providing a data service using an LTE communication system when providing a voice service by an electronic device.

Various embodiments of the present disclosure are directed to an apparatus and a method for providing an LTE service according to a multi-radio environment by an electronic device.

Various embodiments of the present disclosure are directed to an apparatus and a method for providing a multi-communication service (e.g. Simultaneous Voice and LTE (SVLTE)/Simultaneous GSM and LTE (SGLTE)) that simultaneously provides a voice service and a data service in an electronic device.

Various embodiments of the present disclosure provide an apparatus and a method for distinguishably configuring a first antenna for a voice communication service and a second antenna for a data service in a multi-communication service in an electronic device.

Various embodiments of the present disclosure provide an apparatus and a method for connecting a voice modem or a data modem with a first antenna according to a communication scheme in an electronic device including a plurality of antennas.

Various embodiments of the present disclosure provide an apparatus and a method for preventing a data modem from generating a call drop in a voice communication service provided by a voice modem in an electronic device.

According to various embodiments of the present disclosure, a method for an operation of an electronic device includes: transmitting or receiving a voice signal through a first antenna and a data signal through a second antenna when the electronic device provides a multi-communication service, using at least one switch which connects at least one antenna and at least one communication interface with each other; and when the electronic device provides a single communication service, transmitting or receiving a data signal or voice signal through the first antenna, using the at least one switch.

According to various embodiments of the present disclosure, an electronic device includes: a first antenna that transmits or receives a voice signal in providing a multi-communication service; a second antenna that transmits or receives a data signal in providing the multi-communication service; a first modem connected to the first antenna; a second modem connected to the second antenna; and one or more switches that connect the antennas with the modems, wherein when the electronic device provides the multi-communication service, the one or more switches connect the first antenna with the first modem and the second antenna with the second modem, and when the electronic device provides a single communication service, the one or more switches connect the first antenna with the first modem or the second modem.

BRIEF DESCRIPTION OF THE DRAWINGS

The above and other aspects, features, and advantages of the present disclosure will become more apparent to a person of ordinary skill in the art from the following detailed description taken in conjunction with the accompanying drawings, in which.

DETAILED DESCRIPTION

Figure 1:
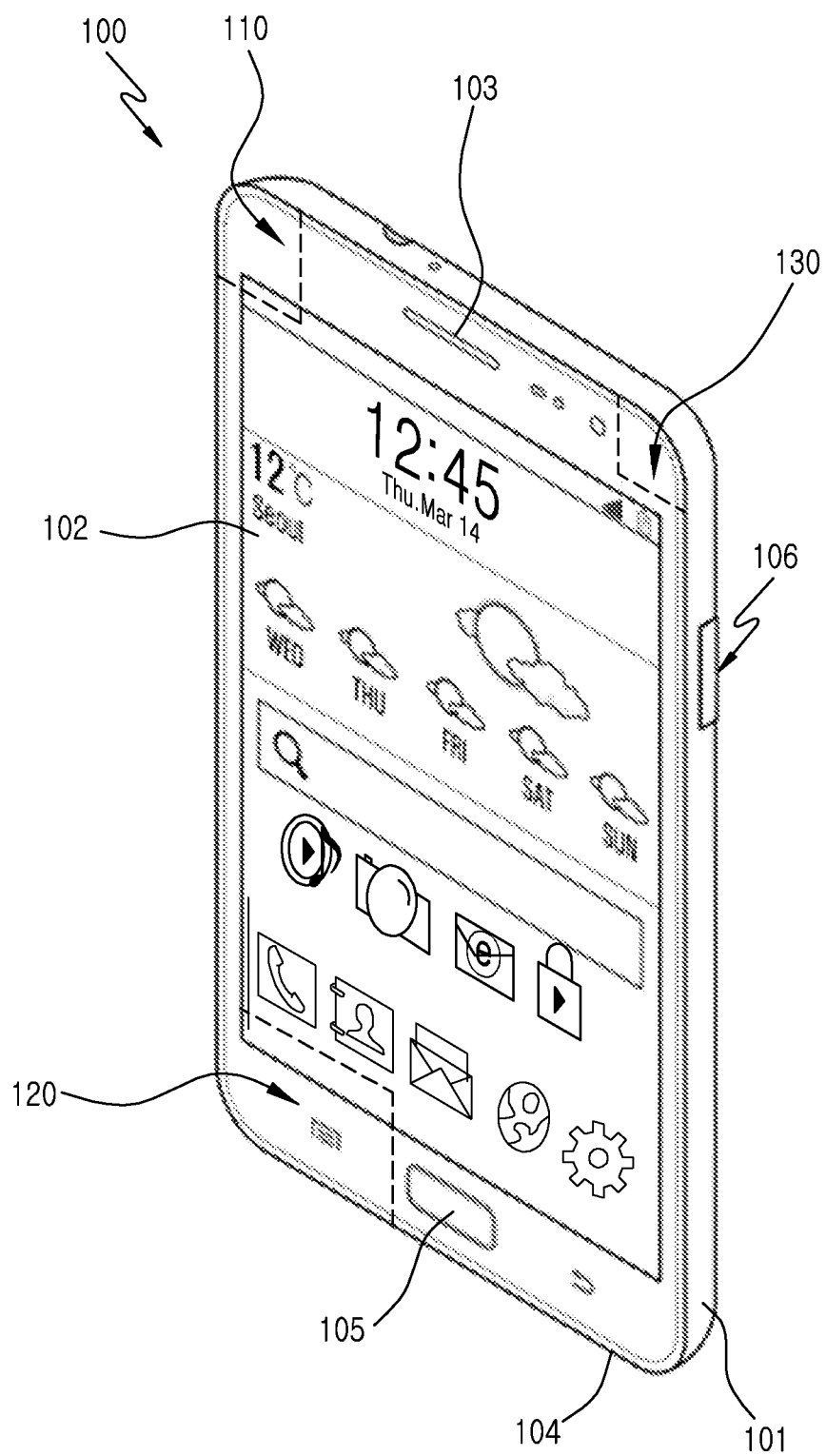
FIG. 1 is a perspective view of an electronic device according to various embodiments of the present disclosure.

Hereinafter, embodiments of the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In the description of the drawings, identical or similar reference numerals are used to designate identical or similar elements.

In the present disclosure, the expression "include" or "may include" refers to the existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected to" or "access" another component, it should be understood that not only the component is directly connected or accessed to the other component, but also there may exist another component between them. Meanwhile, in the case where a component is referred to as being "directly connected" or "directly accessed" to other component, it should be understood that there is no component there between.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to an embodiment of the present disclosure may be a device that has a communication function. For example, the electronic device may include at least one of a smart phone, a tablet Personal Computer (PC), a mobile phone, a video telephone, an e-book reader, a desktop PC, a laptop PC, a netbook computer, a Personal Digital Assistant (PDA), a Portable Multimedia Player (PMP), an MP3 player, a mobile medical appliance, a camera, a game machine, and a wearable device (e.g., a Head-Mounted-Device (HMD) such as electronic glasses, electronic clothing, an electronic bracelet, an electronic necklace, an electronic "appcessory", an electronic tattoo, and a smart watch).

According to some embodiments, the electronic device may be a smart home appliance with a communication function. An example of a smart home appliance as the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame, just to name some non-limiting possible examples.

According to some embodiments, the electronic device may include at least one of various kinds of medical appliances (e.g., a Magnetic Resonance Angiography (MRA) including a communication function, a Magnetic Resonance Imaging (MRI), a Computed Tomography (CT), a scanning machine, an ultrasonic machine, and the like), a navigation device, a Global Positioning System (GPS) receiver, an Event Data Recorder (EDR), a Flight Data Recorder (FDR), a vehicle infotainment device, electronic equipment for a ship (e.g., navigation equipment, a gyrocompass, and the like for a ship), avionics, a security appliance, and an industrial or home robot.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to the various embodiments will be described with reference to the accompanying drawings. In various embodiments, the term "user" may indicate a person using/operating an electronic device or a device (e.g. an artificial intelligence electronic device) using another electronic device.

Hereinafter, a technology for providing a Long Term Evolution (LTE) service by an electronic device will be described as embodiments of the present disclosure.

The following description of the embodiments of the present disclosure is based on an assumption that an electronic device provides a multi-communication service for simultaneously providing a voice communication service and a data service in a multi-wireless communication environment, wherein the electronic device provides the voice communication service using a second Generation (2G) communication scheme, provides a voice communication service using the GSM communication scheme or a Simultaneous Voice and LTE (SVLTE) communication scheme for simultaneously providing a data service using the LTE communication scheme together with the voice communication service, or provides a Simultaneous GSM and LTE (SGLTE) communication for simultaneously providing a data service using the LTE communication scheme together with a voice communication service.

FIG. 1 is a perspective view of an electronic device according to various embodiments of the present disclosure.

Referring to FIG. 1, an electronic device 100 includes a frame 101 which configures the outer experience of the rear surface thereof, and a display module 102 disposed on the front surface thereof. As used herein, the display module 102 may represent a touch screen including a touch panel, through which data input and output can be simultaneously performed, and a display module, such as, for example, a Liquid Crystal Display (LCD) module or an Organic Light Emitting Display (OLED) module.

The electronic device 100 may include a speaker device 103 that may be disposed at the upper part of the display module 102, and a microphone device 104 for voice communication and a home button 105, which may be disposed at the lower part thereof.

The electronic device 100 may include a key button 106, which in this embodiment is disposed on a side surface thereof. For example, the key button 106 may be used as a volume key button or a power key button for the electronic device 100. The power key button may be used as a key button for mode switching between an idle mode and an active mode of the electronic device 100.

The electronic device 100 may include a plurality of antennas for a communication service, which are arranged with areas 110, 120, and 130 defined by dotted lines in FIG. 1. For example, a second antenna for an LTE data communication according to the SVLTE/SGLTE communication may be disposed in a first area 110 and a first antenna for a voice communication according to the SVLTE/SGLTE communication and for a communication service according to roaming may be disposed in a second area 120. A diversity antenna for LTE data communication may be disposed in a third area 130.

Figure 2:
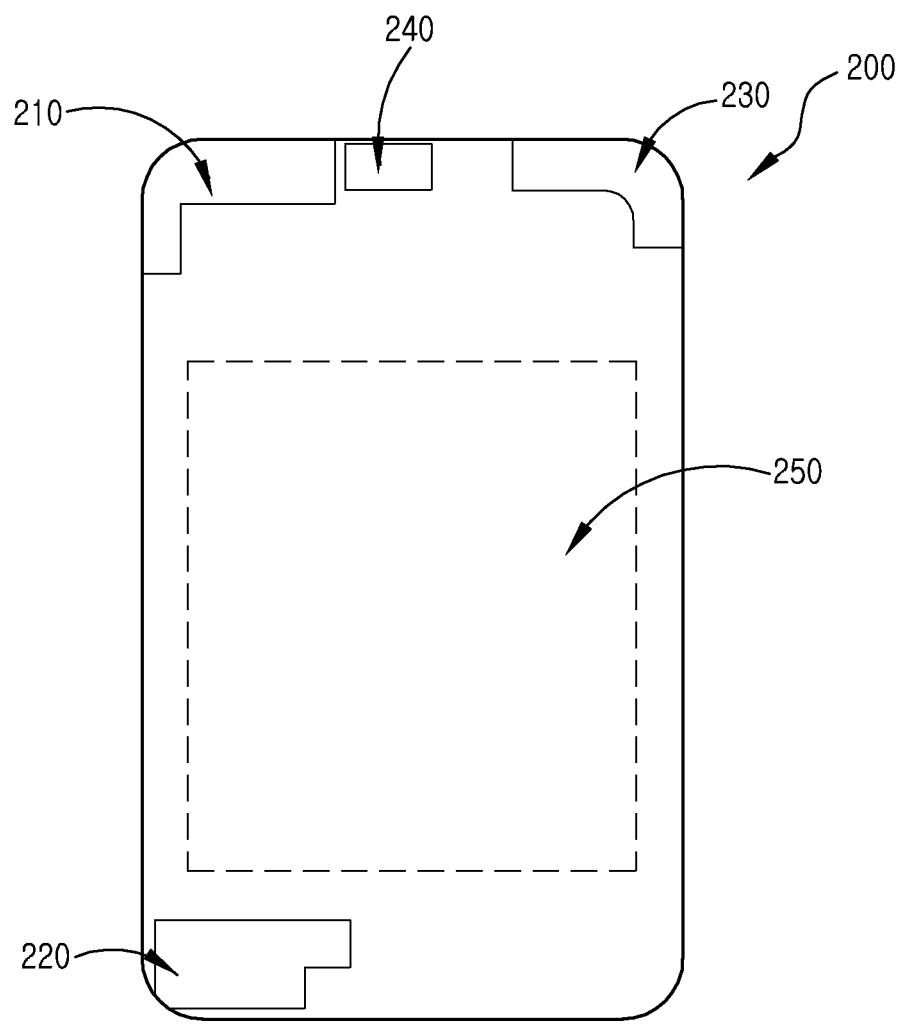
FIG. 2 illustrates an arrangement of antennas of an electronic device according to various embodiments of the present disclosure.

FIG. 2 illustrates an arrangement of antennas of an electronic device according to various embodiments of the present disclosure.

Referring to FIG. 2, an electronic device 200 may include a display module 250 disposed at the front surface thereof.

The areas in which antennas of the electronic device 200 are arranged may be divided into upper areas and lower areas. For example, with reference to the display module 250, the areas may be divided into upper areas and lower areas.

Figure 6A:
FIG. 6A and FIG. 6B illustrate resonance frequencies of antennas according to various embodiments of the present disclosure.
Figure 6B:
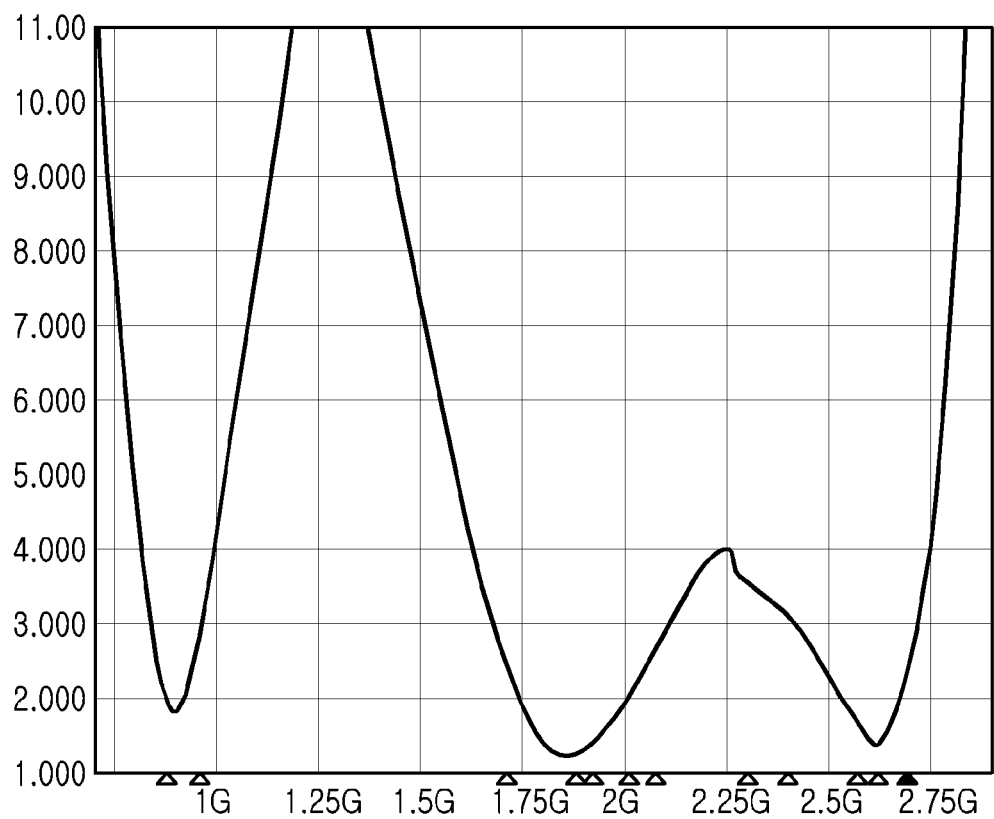

In the electronic device 200, a first antenna 220 provided for a communication service for a voice communication and for roaming-related services according to the SVLTE/SGLTE communication may be disposed at the lower portion of the display module 250. For example, the first antenna 220 may include an antenna capable of securing an antenna resonance frequency in a band of 880 MHz to 960 MHz, a band of 1.7 GHz to 2.1 GHz, or a band of 2.6 GHz, or a higher antenna resonance frequency, such as shown in FIG. 6B, in order to support a voice communication or a communication service according to roaming. As another example, the first antenna 220 may include an antenna capable of securing an antenna resonance frequency for providing a communication service of Global System for Mobile Communication (GSM), Wideband-Code Division Multiple Access (WCDMA), Frequency Division Duplex-LTE (FDD LTE), or Time Division-Synchronous CDMA (TD-SCDMA). In this event, the lower portion of the display module 250 may include an area in which the microphone device 104 and the home button 105 are arranged, such as shown in FIG. 1.

In the electronic device 200, there can be an arrangement of antennas including a second antenna 210 for an LTE data communication according to the SVLTE/SGLTE communication, a satellite antenna 240 for receiving a satellite signal, and a diversity antenna 230 for LTE data communication may be arranged at the upper portion of the display module 250. For example, the second antenna 210 may include an antenna capable of securing an antenna resonance frequency in a band of 1.7 GHz to 2.3 GHz or a higher antenna resonance frequency, as shown in FIG. 6A, in order to support an LTE data communication. As another example, the second antenna 210 may include an antenna capable of securing an antenna resonance frequency for providing a communication service of Time Division Duplex-LTE (TDD LTE), Frequency Division Duplex-LTE (FDD LTE), or Time Division-Synchronous CDMA (TD-SCDMA). In this event, the upper portion of the display module 250 may include an area in which the speaker device 103 is disposed.

As described above, the electronic device 100 may include a first antenna for a voice communication according to the SVLTE/SGLTE communication and for a communication service according to roaming-related services, and a second antenna for an LTE data communication according to the SVLTE/SGLTE communication. Through the use of switches such as shown in FIG. 3, the electronic device 100 may enable a data modem for a data communication and roaming-related communication and a voice modem for voice communication according to an SVLTE/SGLTE communication to selectively use the first antenna and the second antenna according to the communication mode.

Figure 3:
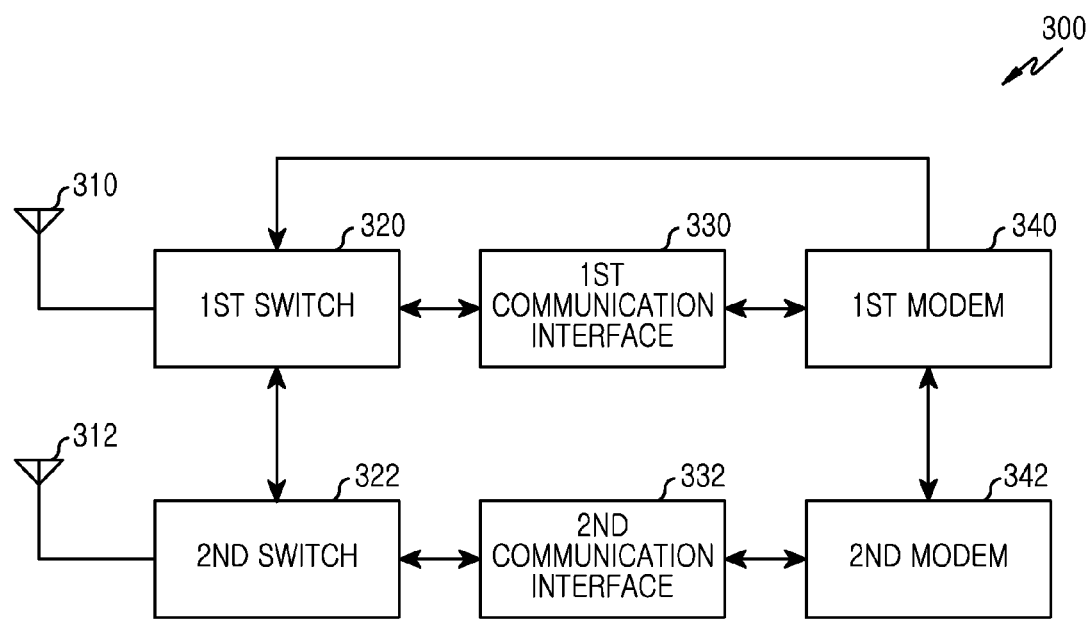
FIG. 3 is a block diagram of an electronic device according to various embodiments of the present disclosure.

FIG. 3 is a block diagram of an electronic device according to various embodiments of the present disclosure.

Referring to FIG. 3, in order to provide a communication service according to the SVLTE/SGLTE communication scheme an electronic device 300 may include first and second antennas 310 and 312, first and second switches 320 and 322, first and second communication interfaces 330 and 332, and first and second modems 340 and 342. Although the illustrated first and second communication interfaces 330 and 332 are physically separated from each other, they may be logically separated within one module. In addition, although the illustrated modems 340 and 342 are physically separated from each other, they may be logically separated within one module.

The first antenna 310 can transmit or receive a signal in a frequency band for a communication service for a voice communication and roaming according to the SVLTE/SGLTE communication. For example, the first antenna 310 may be configured to secure an antenna resonance frequency in a band of 880 MHz to 960 MHz, a band of 1.7 GHz to 2.1 GHz, or a band of 2.6 GHz, or a higher antenna resonance frequency, for a voice communication or a communication service suitable for roaming. As another example, the first antenna 310 may be configured to secure an antenna resonance frequency for providing a communication service of GSM, WCDMA, FDD LTE, or TD-SCDMA.

The second antenna 312 can transmit or receive a signal in a band for an LTE data communication according to the SVLTE/SGLTE communication. For example, the second antenna 312 may be configured to secure an antenna resonance frequency in a band of 1.7 GHz to 2.3 GHz, in order to support an LTE data communication. As another example, the second antenna 312 may be configured to secure an antenna resonance frequency for providing a communication service of TDD LTE, FDD LTE, or TD-SCDMA.

The first switch 320 may connect the communication interfaces 330 and 332 with the first antenna 310. For example, when the electronic device 300 operates in an SVLTE/SGLTE communication mode, the first switch 320 may connect the first antenna 310 with the first communication interface 330. As another example, when the electronic device 300 provides a single communication service (e.g. TD-SCDMA communication service), the first switch 320 may connect the first antenna 310 with the second communication interface 332, using the second switch 312. Here, the single communication service may indicate a communication service that provides a data service or a voice service using one communication scheme from among a second Generation (2G) communication scheme, a third Generation (3G) communication scheme, and an LTE communication scheme (e.g. Circuit Switched Fall Back (CSFB)).

With continued reference to FIG. 3, the second switch 322 may connect the antennas 310 and 312 with the second communication interface 332. For example, when the electronic device 300 operates in the SVLTE/SGLTE communication mode, the second switch 322 may connect the second antenna 312 with the second communication interface 332. As another example, when the electronic device 300 provides a single communication service (e.g. TD-SCDMA communication service), the second switch 322 may connect the first antenna 310 with the second communication interface 332, using the first switch 320.

The first communication interface 330 may process a Radio Frequency (RF) signal transmitted or received through the first antenna 310. For example, the first communication interface 330 may convert an RF signal received through the first antenna 310 into a baseband signal. As another example, the first communication interface 330 may convert a baseband signal received from the first modem 340 into an RF signal.

The second communication interface 332 may process a voice signal or data signal transmitted or received through the first antenna 310 or the second antenna 312. For example, the second communication interface 332 may convert an RF signal received through the first antenna 310 or the second antenna 312 into a baseband signal. As another example, the second communication interface 332 may convert a baseband signal received from the second modem 342 into an RF signal.

The first modem 340 may process a voice signal of the baseband that is transmitted or received through the first communication interface 330 according to the SVLTE/SGLTE communication mode. For example, when the electronic device 300 operates in the SVLTE/SGLTE communication mode, the first modem 340 may modulate or demodulate a voice signal of the baseband according to the 2G communication scheme. As another example, when the electronic device 300 does not operate in the SVLTE/SGLTE communication mode, the first modem 340 may shift into a lower power mode or be deactivated. Here, the 2G communication scheme may include at least one among a GSM network, an Enhanced Data GSM Environment (EDGE) network, and a CDMA network.

The second modem 342 may process a data signal or voice signal of the baseband that is transmitted or received through the second communication interface 332. For example, when the electronic device 300 operates in the SVLTE/SGLTE communication mode, the second modem 342 may modulate or demodulate a data signal of the baseband according to the LTE communication scheme. As another example, when the electronic device 300 does not operate in the SVLTE/SGLTE communication mode, the second modem 342 may modulate or demodulate a data signal or voice signal of the baseband according to one communication scheme among the 2G communication scheme, the 3G communication scheme, and the LTE communication scheme. Here, the 3G communication scheme may include at least one scheme from among a W-CDMA network and a TD-SCDMA network.

Figure 4A:
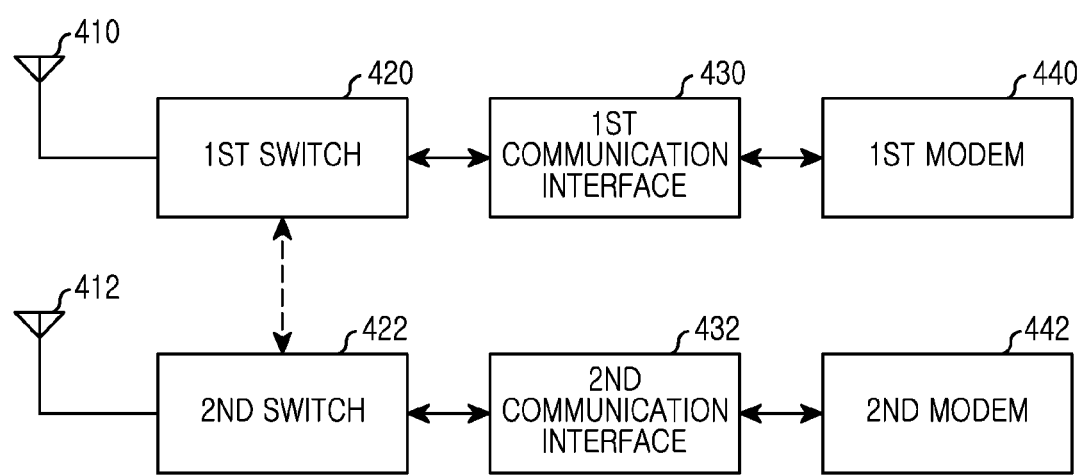
FIG. 4A and FIG. 4B illustrate respective operations of an electronic device according to various embodiments of the present disclosure.
Figure 4B:
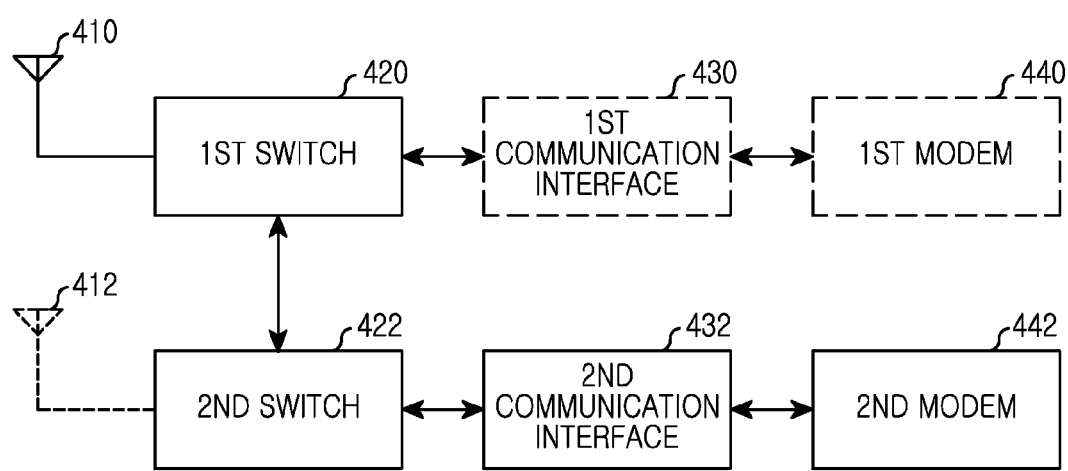

FIGS. 4A and 4B illustrate an operation of an electronic device according to various embodiments of the present disclosure.

Referring to FIG. 4A, in the case of providing a multi-communication service (e.g. SVLTE/SGLTE communication mode), an electronic device may connect a first antenna 410 with a first communication interface 430 via a first switch 420 and may connect a second antenna 412 with a second communication interface 432 via a second switch 422. The dotted line in FIG. 4A indicates deactivation of the connection between the first switch 420 and the second switch 422, such as previously shown in FIG. 3.

The first communication interface 430 may process an RF signal transmitted or received through the first antenna 410.

A first modem 440 can modulate or demodulate a voice signal of the baseband that is transmitted or received through a first communication interface 430 according to the 2G communication scheme.

A second communication interface 432 may process a data signal transmitted or received through the second antenna 412.

A second modem 442 can modulate or demodulate a data signal of the baseband transmitted or received through the second communication interface 432 according to the LTE communication scheme.

When the electronic device operates in the SVLTE/SGLTE communication mode as described above, a voice modem may be connected with the first antenna 410 for transmitting or receiving a signal of a band for a voice service and can process a voice signal transmitted or received through the first antenna 410, and a data modem may be connected with the second antenna 412 for transmitting or receiving a signal of a band for a data service and can process a data signal transmitted or received through the second antenna 412.

Referring now to FIG. 4B, when the electronic device provides a single communication service, the electronic device may connect the first antenna 410 with the second communication interface 432 using the connection between first switch 420 and the second switch 422. When the electronic device provides a single communication service, the first communication interface 430, the first modem 440, and the second antenna 412, which are illustrated by dotted lines in FIG. 4B, may be deactivated.

For example, when the electronic device provides a TD-SCDMA communication service, the electronic device may connect the first antenna 410 with the second communication interface 432 using the first switch 420 and the second switch 422. The second modem 442 may provide a voice service or a data service according to the TD-SCDMA communication scheme using a signal transmitted or received through the second communication interface 432.

Figure 5:
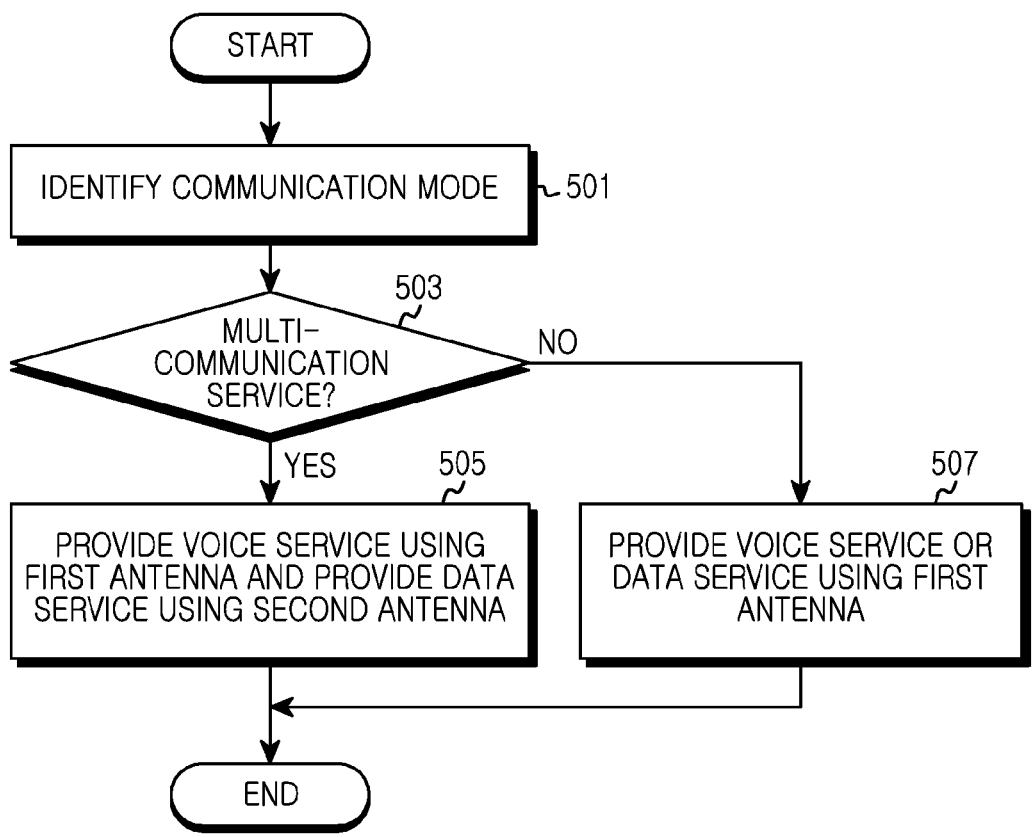
FIG. 5 is a flowchart that illustrates a process for providing a communication service by an electronic device according to various embodiments of the present disclosure.

FIG. 5 is a flowchart that illustrates a process for providing a communication service by an electronic device according to various embodiments of the present disclosure.

Referring to FIG. 5, the electronic device may include a first antenna capable of transmitting or receiving a signal of a band for a voice communication according to a multi-communication service and for a communication service according to roaming, and may include a second antenna capable of transmitting or receiving a signal of a band for an LTE data communication according to the multi-communication service. According to one embodiment, the first antenna 310 may be configured to secure an antenna resonance frequency in a band of 880 MHz to 960 MHz, a band of 1.7 GHz to 2.1 GHz, or a band of 2.6 GHz, or a higher antenna resonance frequency, for a voice communication or a communication service according to roaming, and the second antenna 312 may be configured to secure an antenna resonance frequency in a band of 1.7 GHz to 2.3 GHz, in order to support an LTE data communication. According to one embodiment, the first antenna may be configured to secure an antenna resonance frequency for providing a communication service of GSM, WCDMA, FDD LTE, or TD-SCDMA, and the second antenna may be configured to secure an antenna resonance frequency for providing a communication service of TDD LTE, FDD LTE, or TD-SCDMA.

At operation 501, the electronic device may identify the communication mode. According to one embodiment, the electronic device may identify the communication mode in consideration of at least one communication mode from among the characteristic of the SIM card thereof and location information of the electronic device.

At operation 503, the electronic device may determine whether to operate in a multi-communication service mode (e.g. SVLTE/SGLTE communication mode). According to one embodiment, when a SIM card to which SVLTE/SGLTE service information has been allocated is inserted therein, the electronic device may first recognize that the electronic device operates in the SVLTE/SGLTE communication mode.

When the electronic device has determined affirmatively in operation 503 to operate in the multi-communication service mode, then at operation 505 the electronic device may provide a voice service using the first antenna and simultaneously provide a data service using the second antenna.

When the electronic device has determined in operation 503 that there is no multi-communication service, then the electronic device operates in a single communication service (e.g. TD-SCDMA), and may provide a voice service or a data service using the first antenna in operation 507. According to one embodiment, when the electronic device provides a single communication service, the electronic device may process a signal according to one communication scheme from among a 2G communication scheme, a 3G communication scheme, and an LTE communication scheme.

In the embodiments described above, the electronic device may connect the first antenna with the first communication interface or the second communication interface using switches. In this event, the switches of the electronic device may connect the first antenna with the first communication interface or the second communication interface according to the control of the first modem or the second modem.

Figure 7:
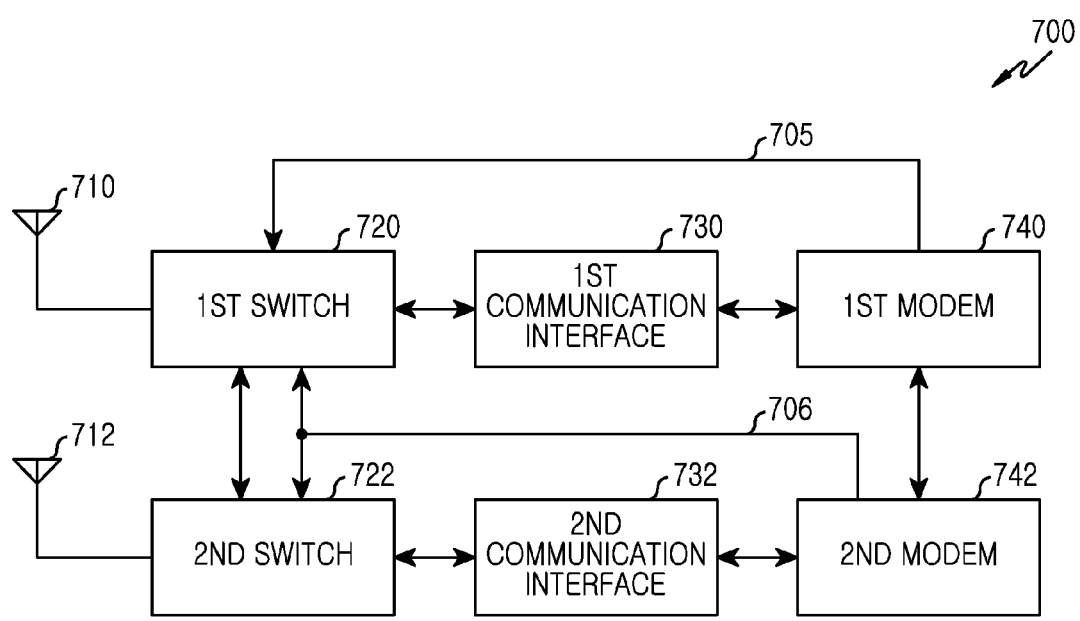
FIG. 7 is a block diagram illustrating a control of switches by a modem of an electronic device according to various embodiments of the present disclosure.

FIG. 7 is a block diagram for showing a control of switches by modems of an electronic device according to various embodiments of the present disclosure.

Referring to FIG. 7, an electronic device 700 may include first and second antennas 710 and 712, first and second switches 720 and 722, first and second communication interfaces 730 and 732, and first and second modems 740 and 742, in order to provide a communication service according to the SVLTE/SGLTE communication scheme.

When the electronic device 700 operates in the SVLTE/SGLTE communication mode, the first modem 740 may control the switching operation of the first switch 720 in order to process a voice signal according to the SVLTE/SGLTE communication scheme. For example, when the electronic device 700 operates in the SVLTE/SGLTE communication mode, the first modem 740 may be determined as a control module of the first switch 720 by the second modem 742. Accordingly, the first modem 740 may control the first switch 720, for example, via line 705, to connect the first antenna 710 with the first communication interface 730, in order to process a voice signal according to the SVLTE/SGLTE communication scheme.

The second modem 742 may control the switching operations of both the first switch 720 and the second switch 722, for example, via line 706. For example, when the electronic device 700 operates in the SVLTE/SGLTE communication mode, the second modem 742 may determine the first modem 740 as a control module of the first switch 720. Then, the second modem 742 may control the second switch 722 to connect the second antenna 712 with the second communication interface 732, in order to process a data signal according to the SVLTE/SGLTE communication scheme. As another example, when the electronic device 700 provides a single communication service, the second modem 742 may control the first switch 720 and the second switch 722 in order to enable selective use of the first antenna 710 and the second antenna 712 for a data communication or voice communication.

The first switch 720 may connect the communication interfaces 730 and 732 with the first antenna 710 under the control of the first modem 740 or the second modem 742. For example, when the electronic device 700 operates in the SVLTE/SGLTE communication mode, the first switch 720 may connect the first antenna 710 with the first communication interface 730 according to the control of the first modem 740. As another example, when the electronic device 700 provides a single communication service, the first switch 720 may connect the first antenna 710 with the second communication interface 732 using the second switch 712 according to the control of the second modem 742. In other words, when the first modem 740 enters a lower power mode or is deactivated according to the single communication service, the first switch 720 may connect the first antenna 710 with the second communication interface 732 according to the control of the second modem 742.

The second switch 722 may connect the first and second antennas 710 and 712 with the second communication interface 732 according to the control of the second modem 742. For example, when the electronic device 700 operates in the SVLTE/SGLTE communication mode, the second switch 722 may connect the second antenna 712 with the second communication interface 732 according to the control of the second modem 742. As another example, when the electronic device 700 provides a single communication service, the second switch 722 may connect the first antenna 710 with the second communication interface 732 using the first switch 720 according to the control of the second modem 742. In other words, when the first modem 740 enters a lower power mode or is deactivated, the first switch 722 may connect the first antenna 710 with the second communication interface 732 according to the control of the second modem 742.

Figure 8:
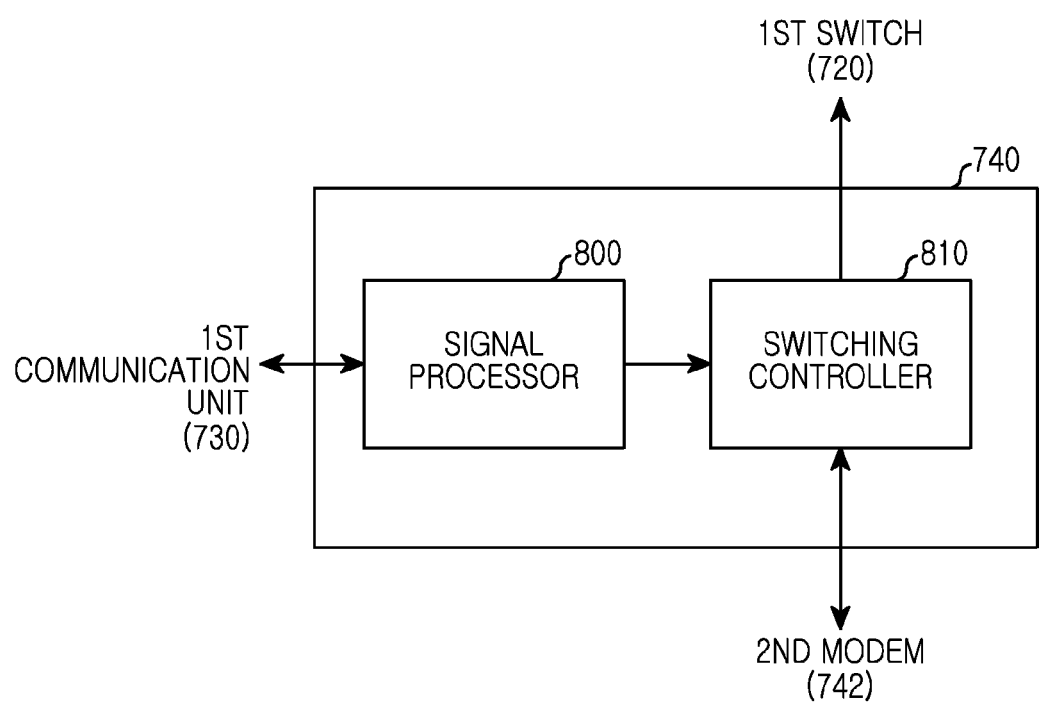
FIG. 8 is a block diagram illustrating in detail the construction of a first modem according to various embodiments of the present disclosure.

FIG. 8 is a block diagram illustrating in detail the construction of a first modem according to various embodiments of the present disclosure.

Referring to FIG. 8, the first modem 740 may include a signal processor 800 and a switch controller 810.

The signal processor 800 can process a voice signal of the baseband that is transmitted or received through the first communication interface 730 according to the SVLTE/SGLTE communication mode. For example, when the electronic device 700 operates in the SVLTE/SGLTE communication mode, the signal processor 800 may modulate or demodulate a voice signal of the baseband according to the 2G communication scheme.

When the electronic device 700 operates in the SVLTE/SGLTE communication mode, the switch controller 810 may control the switching operation of the first switch 720 so as to enable the signal processor 800 to process a voice signal according to the SVLTE/SGLTE communication scheme. For example, when receiving a control signal for the first switch 720 from the second modem 742, the switch controller 810 may control the first switch 720 to connect the first antenna 710 with the first communication interface 730, in order to process a voice signal according to the SVLTE/SGLTE communication scheme.

When the electronic device 700 provides a single communication service, the switch controller 810 may control the first modem 740 to shift into a lower power mode or to be deactivated.

Figure 9:
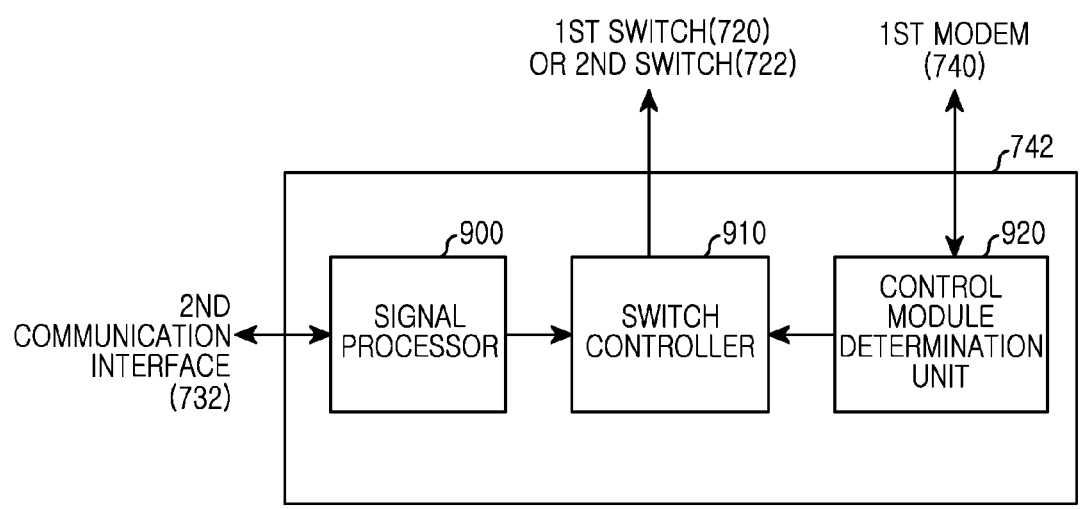
FIG. 9 is a block diagram illustrating in detail the construction of a second modem according to various embodiments of the present disclosure.

FIG. 9 is a block diagram illustrating in detail the construction of a second modem according to various embodiments of the present disclosure.

Referring to FIG. 9, the second modem 742 may include a signal processor 900, a switch controller 910, and a control module determination unit 920.

The signal processor 900 can process a data signal or voice signal of the baseband that is transmitted or received through the second communication interface 732. For example, when the electronic device 700 operates in the SVLTE/SGLTE communication mode, the signal processor 900 may modulate or demodulate a data signal of the baseband according to the LTE communication scheme. As another example, when the electronic device 700 provides a single communication service, the signal processor 900 may modulate or demodulate a data signal or voice signal of the baseband according to one communication scheme among the 2G communication scheme, the 3G communication scheme, and the LTE communication scheme.

The control module determination unit 920 can determine a control module for controlling the switching of the first switch 720 and the second switch 722. For example, when the electronic device 700 operates in the SVLTE/SGLTE communication mode, the control module determination unit 920 may determine the first modem 740 as a control module of the first switch 720 and determine the second modem 742 as a control module of the second switch 722. As another example, when the electronic device 700 provides a single communication service, the control module determination unit 920 may determine the second modem 742 as a control module of the first switch 720 and the second switch 722.

The switch controller 910 may control the switching of at least one switch among the first switch 720 and the second switch 722 according to the control of the control module determination unit 920. For example, when the electronic device 700 operates in the SVLTE/SGLTE communication mode, the switch controller 910 may control the second switch 722 to connect the second antenna 712 with the second communication interface 732, in order to process a data signal according to the SVLTE/SGLTE communication scheme. As another example, when the electronic device 700 provides a single communication service, the switch controller 910 may control the first switch 720 and the second switch 722 in order to enable selective use of the first antenna 710 and the second antenna 712 for a data communication or voice communication.

In the embodiment described above, the electronic device 700 may control the switching of the first switch 720 through the first modem 740 or the second modem 742 according to the determination of the second modem 742.

According to another embodiment, the electronic device 700 may control the switching of the first switch 720 through the second modem 742. In this event, the modem 740 may transmit voice service provision information in order to prevent the second modem 742 from interrupting the voice service.

For example, when the electronic device 700 provides a voice service according to the SVLTE/SGLTE communication mode, the first modem 740 may transmit communication service provision information to the second modem 742 using the switch controller 810. In this event, using the switch controller 910, the second modem 742 may control the first switch 720 to maintain the connection between the first antenna 710 and the first communication interface 730, so as to prevent interruption of the voice service of the first modem.

In the embodiment described above, the electronic device may control the switches to connect the first antenna with the first communication interface or the second communication interface according to the control of the first modem or the second modem.

In another embodiment, the electronic device may connect the first antenna with the first communication interface or the second communication interface using the modems and a separate control module.

Figure 10:
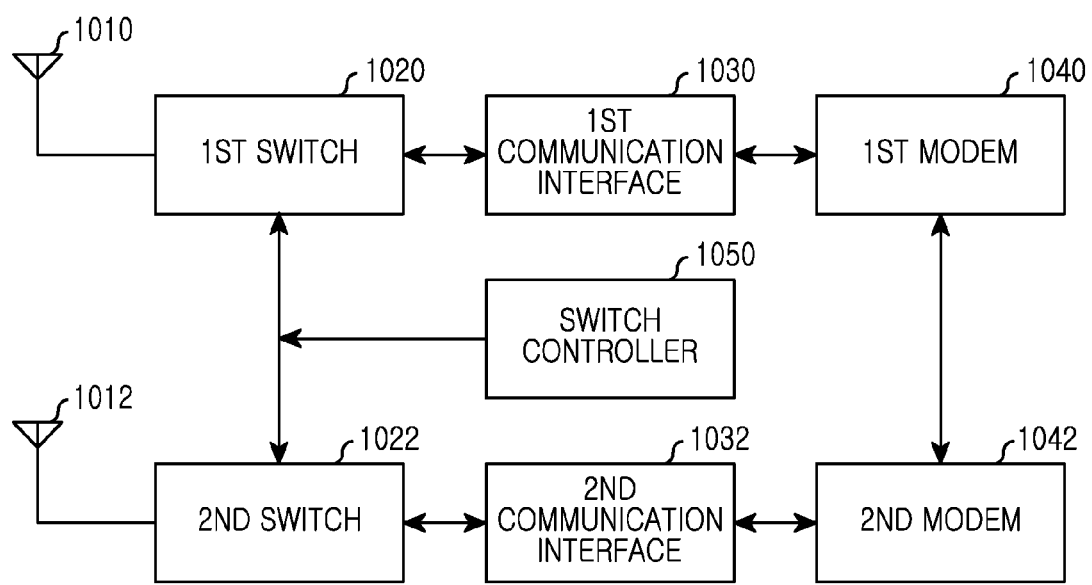
FIG. 10 is a block diagram illustrating a control of switches by a switch controller of an electronic device according to various embodiments of the present disclosure.

FIG. 10 is a block diagram for showing a control of switches by a switch controller of an electronic device according to various embodiments of the present disclosure.

Referring to FIG. 10, an electronic device 700 may include antennas 1010 and 1012, switches 1020 and 1022, communication interfaces 1030 and 1032, modems 1040 and 1042, and a switch controller 1050 in order to provide a communication service according to the SVLTE/SGLTE communication scheme. The switch controller 1050 may be configured by hardware, software, firmware, or combinations thereof, but in any event does not constitute software per se, as the controller includes circuitry that is configured for operation.

The switch controller 1050 may control the switching operations of the first switch 1020 and the second switch 1022. Referring to FIG. 4A, in the case of operating in the SVLTE/SGLTE communication mode, the switch controller 1050 may control the first switch 1020 to connect the first antenna 1010 with the first communication interface 1030 and may control the second switch 1022 to connect the second antenna 1012 with the second communication interface 1032. According to another embodiment, when the electronic device provides a single communication service, the switch controller 1050 may control the first switch 1020 and the second switch 1022 to connect the first antenna 1010 with the second communication interface 1032.

The first switch 1020 may connect the first and second communication interfaces 1030 and 1032 with the first antenna 1010 according to the control of the switch controller 1050.

The second switch 1022 may connect the antennas 1010 and 1012 with the second communication interface 1032 according to the control of the switch controller 1050.

Figure 11:
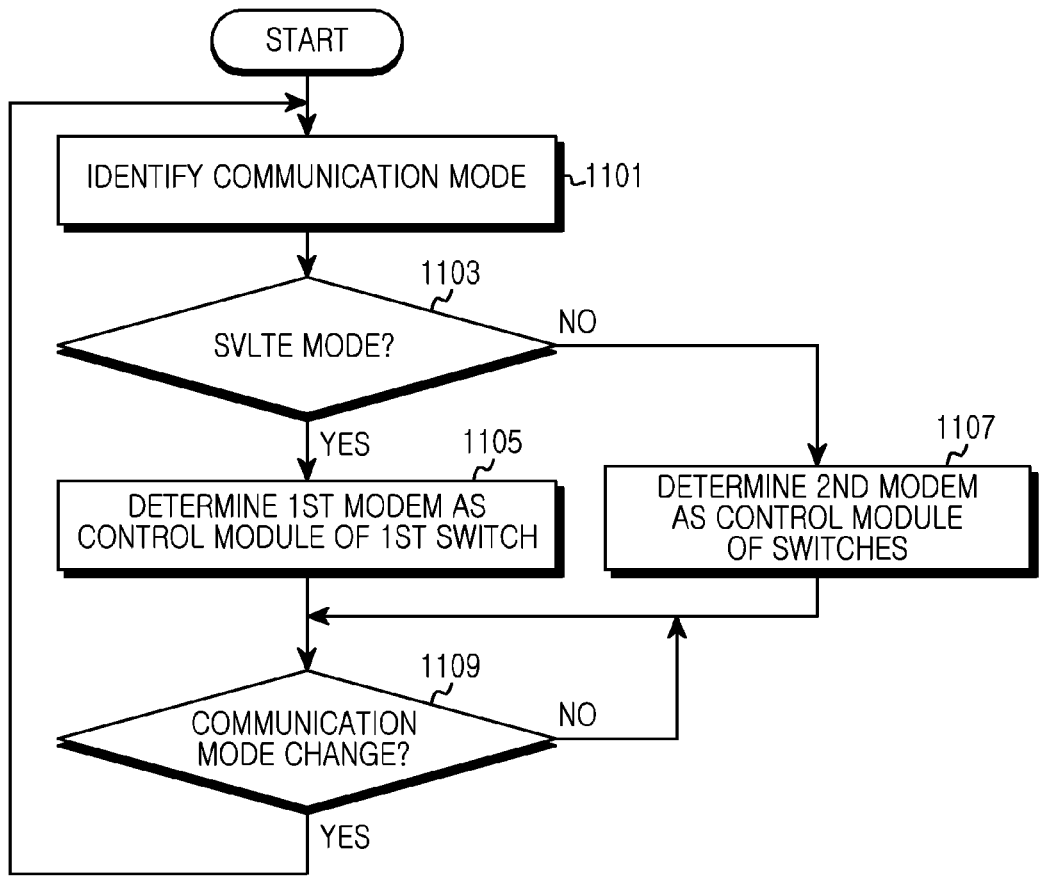
FIG. 11 is a flowchart that illustrates a process for controlling switches by a second modem according to various embodiments of the present disclosure.

FIG. 11 is a flowchart that illustrates a process for controlling switches by a second modem according to various embodiments of the present disclosure.

Referring to FIG. 11, at operation 1101 the second modem 742 may identify the mode of the electronic device 700. For example, the second modem 742 may determine the communication mode of the electronic device 700 in consideration of at least one among the characteristic of the SIM card thereof and location information of the electronic device 700.

At operation 1103, by determining the communication mode of the electronic device 700, the second modem 742 may determine whether the electronic device operates in the SVLTE/SGLTE communication mode.

For example, when the electronic device 700 operates in the SVLTE/SGLTE communication mode, the second modem 742 may determine the first modem 740 as a control module of the first switch 710 and the second modem 742 as a control module of the second switch 712 in operation 1105. Accordingly, the first modem 740 may control the first switch 720 to connect the first antenna 710 with the first communication interface 730, in order to process a voice signal according to the SVLTE/SGLTE communication scheme. Further, the second modem 742 may control the second switch 722 to connect the second antenna 712 with the second communication interface 732, in order to process a data signal according to the SVLTE/SGLTE communication scheme.

As a result of the determination in operation 1103, when the electronic device 700 does not operate in the SVLTE/SGLTE communication mode, then at operation 1107 the second modem 742 may be determined to be a control module of the first switch 710 and the second switch 712. Accordingly, the second modem 742 may control the first switch 720 and the second switch 722 so as to enable selective use of the first antenna 710 and the second antenna 712 according to the communication scheme for a data communication or voice communication.

When a control module of the switches has been determined in operation 1105 or operation 1107, the second modem 742 may determine, at operation 1109, whether the communication mode of the electronic device 700 changes.

When the communication mode of the electronic device 700 has changed, at operation 1101, the second modem 742 can identify the changed communication mode of the electronic device.

In the embodiment described above, the second modem 742 of the electronic device 700 can determine a control mode of the first switch 720 on the basis of the communication mode of the electronic device 700.

In another embodiment, the second modem 742 of the electronic device 700 may determine a control mode of the first switch 720 on the basis of an operation state of the first modem 740. For example, when the electronic device 700 operates in the SVLTE/SGLTE communication mode, the first modem 740 may be activated and may provide a voice service. When the electronic device 700 provides a single communication service, the first modem 740 may be switched into a lower power mode or may be deactivated. Accordingly, when the first modem 740 is activated, the second modem 742 may determine that the electronic device 700 is operating in the SVLTE/SGLTE communication mode, and may thus determine the first modem 740 as being a control module of the first switch 710. In contrast, when the first modem 740 is switched into the lower power mode or is deactivated, the second modem 742 may determine that the electronic device 700 provides a single communication service, and may thus determine the second modem 742 as being a control module of the first switch 710.

In the embodiment described above, the electronic device 700 may determine a control module of the switches 710 and 712 using the second modem 742.

In another embodiment, the electronic device 700 may include at least one separate module for determining a control mode of the switches 710 and 712 on the basis of the communication mode of the electronic device 700 or the operation state of the first modem 740.

Figure 12:
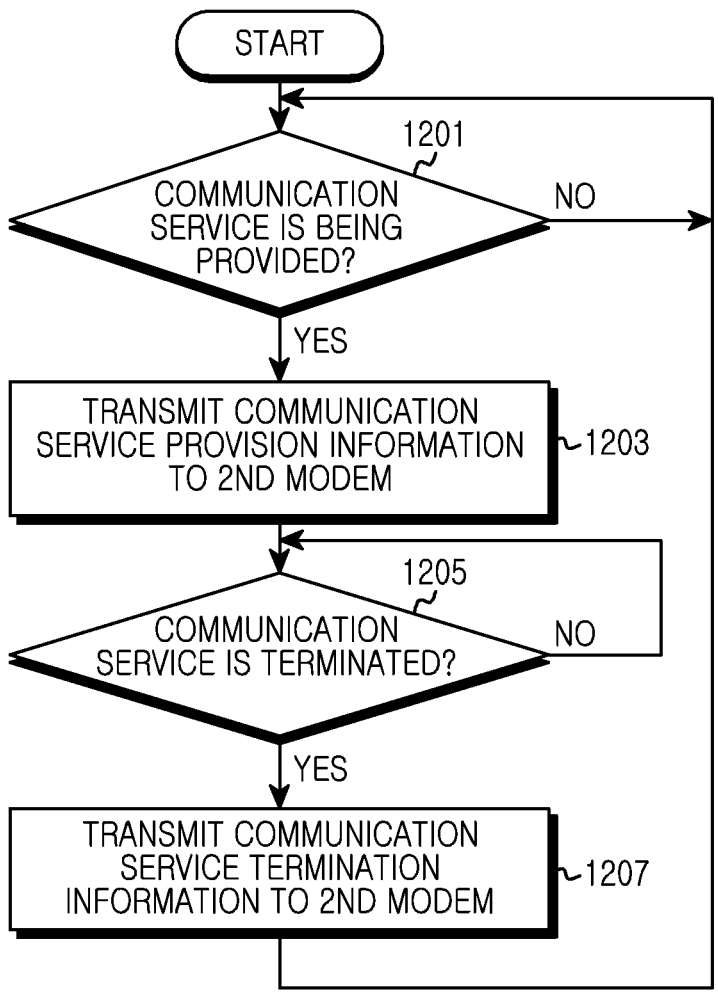
FIG. 12 illustrates a process for transmitting communication service provision information by a first modem according to various embodiments of the present disclosure.

FIG. 12 is a flowchart that illustrates a process for transmitting communication service provision information by a first modem according to various embodiments of the present disclosure.

Referring to FIG. 12, at operation 1201, the first modem 740 may determine whether a communication service is being provided. For example, the first modem 740 may determine whether a voice signal for a voice communication service is being transmitted or received.

When a communication service is being provided, then at operation 1203 the first modem 740 may transmit communication service provision information to the second modem 742. For example, the first modem 740 may notify the second modem 742 that the communication service is being provided through the first antenna 710.

At operation 1205, when the first modem 740 has transmitted the communication service provision information, the first modem 740 may determine whether or not the communication service is terminated.

When the communication service is terminated, then at operation 1207 the first modem 740 may transmit communication service termination information to the second modem 742. For example, the first modem 740 may notify the second modem 742 of the termination of the use of the first antenna 710.

Figure 13:
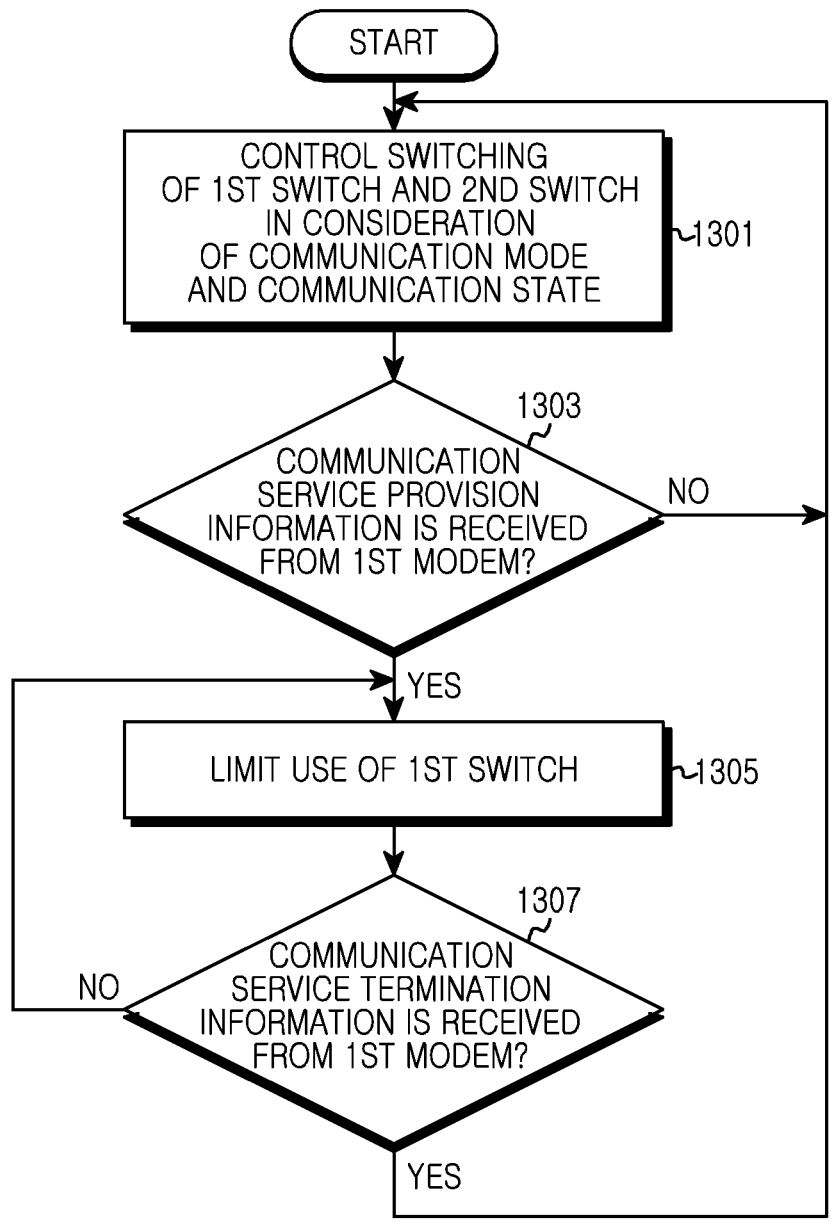
FIG. 13 is a flowchart that illustrates a process for controlling switches by a second modem according to various embodiments of the present disclosure.

FIG. 13 is another flowchart that illustrates a process for controlling switches by a second modem according to various embodiments of the present disclosure.

Referring to FIG. 13, at operation 1301, the second modem 742 may control the switching of the first switch 710 and the second switch 712 on the basis of the communication mode and the communication state of the electronic device 700.

For example, when the electronic device 700 operates in the SVLTE/SGLTE communication mode, the second modem 742 may control the first switch 720 to connect the first antenna 710 with the first communication interface 730 and the second switch 722 to connect the second antenna 712 with the second communication interface 732. As another example, when the electronic device 700 provides a single communication service, the second modem 742 may control the first switch 720 and the second switch 722 in order to enable the first antenna 710 and the second communication interface 732 to be connected with each other.

At operation 1303, the second modem 742 may determine whether communication service provision information is received from the first modem 740.

When communication service provision information is not received from the first modem 740, then at operation 1301 the second modem 742 may control the switching of the first switch 710 and the second switch 712 on the basis of the communication mode and the communication state of the electronic device 700.

As a result of the determination in operation 1303, when communication service provision information has been received from the first modem 740, the second modem 742 may determine that a voice communication service is being provided through the first antenna 710. Then, at operation 1305, the second modem 742 may limit use of the first switch 720 by the second modem 742. For example, the second modem 742 may control the first switch 720 to maintain the connection between the first antenna 710 and the first communication interface 730.

At operation 1307, the second modem 742 may determine whether communication service termination information is received from the first modem 740.

When the communication service termination information is not received, the second modem 742 may maintain the limitation for preventing the second modem 742 from using the first switch 720.

As a result of the determination at operation 1307, when communication service termination information has been received, the second modem 742 may determine that the voice communication service provided through the first antenna 710 by the first modem has been terminated. Therefore, the second modem 742 may control the switching of the first switch 720 and the second switch 722 on the basis of the communication mode and the communication state of the electronic device 700.

In the embodiment described above, the electronic device 700 may control switching of the first and second switches 710 and 712 using the second modem 742.

In another embodiment, the electronic device 700 may include at least one separate module for controlling the switching of the switches 720 and 722 on the basis of the communication mode of the electronic device 700 or the operation state of the first modem 740.

Figure 14:
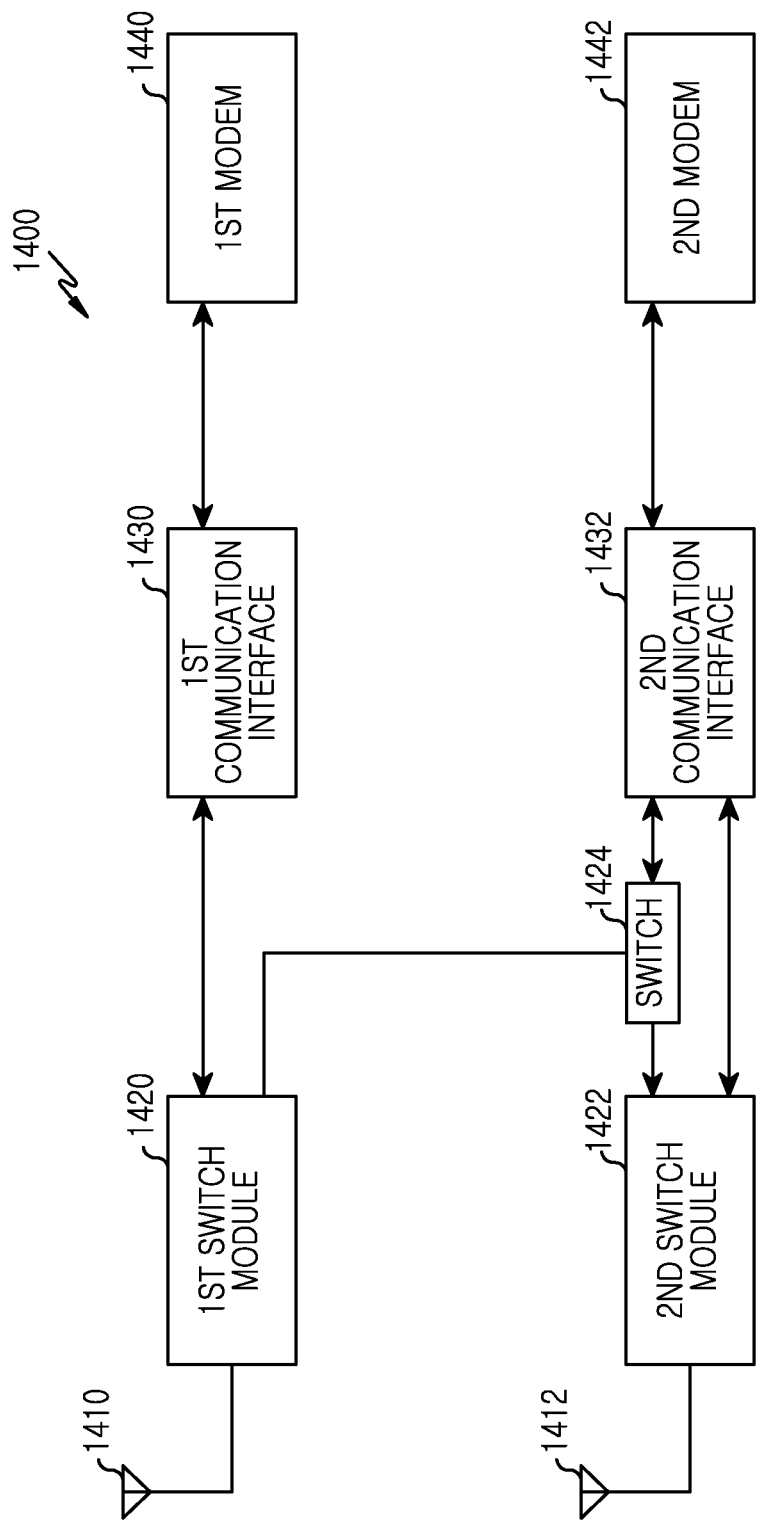
FIG. 14 is a block diagram of an electronic device according to various embodiments of the present disclosure.

FIG. 14 is a block diagram of an electronic device according to various embodiments of the present disclosure.

Referring to FIG. 14, an electronic device 1400 may include first and second antennas 1410 and 1412, first and second switch modules 1420 and 1422, a switch 1424, first and second communication interfaces 1430 and 1432, and first and second modems 1440 and 1442, in order to provide a communication service according to the SVLTE/SGLTE communication scheme. Although the illustrated first and second communication interfaces 1430 and 1432 are physically separated from each other, they may be logically separated within one module. Although the illustrated first and second modems 1440 and 1442 are physically separated from each other, they may be logically separated within one module.

The first antenna 1410 can transmit or receive a signal in a band for a communication service for a voice communication and roaming according to the SVLTE/SGLTE communication. For example, the first antenna 1410 may be configured to secure an antenna resonance frequency in a band of 880 MHz to 960 MHz, a band of 1.7 GHz to 2.1 GHz, or a band of 2.6 GHz, or a higher antenna resonance frequency, for a voice communication or a communication service according to roaming. As another example, the first antenna 1410 may be configured to secure an antenna resonance frequency for providing a communication service of GSM, WCDMA, FDD LTE, or TD-SCDMA.

The second antenna 1412 can transmit or receive a signal in a band for an LTE data communication according to the SVLTE/SGLTE communication. For example, the second antenna 1412 may be configured to secure an antenna resonance frequency in a band of 1.7 GHz to 2.3 GHz, in order to support an LTE data communication. As another example, the second antenna 1412 may include an antenna capable of securing an antenna resonance frequency for providing a communication service of TDD LTE, FDD LTE, or TD-SCDMA.

The first switch module 1420 may connect a signal transmitted or received through the first antenna 1410 with a transmission/reception path corresponding to a communication service. For example, when the electronic device 1400 operates in an SVLTE/SGLTE communication mode, the first switch module 1420 may connect the first antenna 1410 with the first communication interface 1430 so as to enable provision of a voice communication service according to a 2G communication scheme using the first antenna 1410. As another example, when the electronic device 1400 provides a single communication service on the basis of TD-SCDMA, the first switch module 1420 may connect the first antenna 1410 with the second communication interface 1432 so as to enable a provision of a TD-SCDMA communication service using the first antenna 1410. In this event, the first switch module 1420 may additionally use the switch 1424 to connect the first antenna 1410 with the second communication interface 1432.

The second switch module 1422 may connect a signal transmitted or received through the second antennas 1412 with a transmission/reception path corresponding to the communication service. For example, when the electronic device 300 operates in an SVLTE/SGLTE communication mode, the second switch module 1422 may connect the second antenna 1412 with the second communication interface 1432 so as to enable a provision of an LTE data service using the second antenna 1412. As another example, when the electronic device provides a data service of a multi-communication service on the basis of TD-SCDMA, the second switch module 1422 may connect the second antenna 1412 with the second communication interface 1432 so as to enable provision of a TD-SCDMA-based data service, using the second antenna 1412.

The switch 1424 may connect the first switch module 1420 or the second switch module 1422 with the second communication interface 1432. For example, the switch 1424 may include an SP2T switch.

As described above, when an electronic device provides a multi-communication service (e.g. SVLTE/SGLTE), the electronic device may provide a voice communication service using a first antenna disposed at the lower end of the electronic device and may provide a data service using a second antenna disposed at the upper end of the electronic device. Further, when providing a single communication service, the electronic device may a voice communication service or data service using the first antenna. As a result, in providing a multi-communication service or a single communication service, the electronic device can satisfy the standard for the Specific Absorption Rate (SAR) of electromagnetic wave by human bodies and the antenna design standard for improvement of the antenna performance.

In an electronic device, which provides a multi-communication service and includes a first antenna for a voice communication service and a second antenna for a data service, a data modem is prevented from accessing the first antenna when the electronic device provides a voice communication service through a voice modem, thereby preventing the data modem from generating an interruption (call drop) of the voice communication service.

The apparatuses and methods of the disclosure can be implemented in hardware, and in part as firmware or as software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101.

The definition of the terms "unit" or "module" as referred to herein are to be understood as constituting hardware circuitry such as a CCD, CMOS, a processor or microprocessor configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

Meanwhile, although the embodiments of the present disclosure have been described in the detailed description of the present disclosure, various modifications, such as sequence change, incorporation, reuse, or omission in the operations of the electronic device, can be made without departing from the scope of the present disclosure. Therefore, the scope of the present disclosure should not be limited to the aforementioned embodiments, but should be defined by the equivalents to the appended claims as well as the claims.

What is claimed is:

1. A method for operating an electronic device, the method comprising:
   transmitting or receiving a voice signal through a first antenna and transmitting or receiving a data signal through a second antenna when the electronic device provides a multi-communication service by using at least one switch which connects the first antenna with a first communication interface and a first modem and the second antenna with a second communication interface and a second modem; and
   when the electronic device provides a single communication service:
      transmitting or receiving a data signal or a voice signal through the first antenna, using the at least one switch;
      connecting the first antenna to the second modem; and
      deactivating the first modem.

2. The method of claim 1, wherein the first antenna operates at a resonance frequency in a band of 880 MHz to 960 MHz, a band of 1.7 GHz to 2.1 GHz, and a band of 2.6 GHz.

3. The method of claim 1, wherein the first antenna transmits or receives a signal from at least one communication system from among a second Generation (2G) communication system, a third Generation (3G) communication system, and a Long Term Evolution (LTE) communication system,
   the 2G communication system comprises at least one network from among a Global System for Mobile Communication (GSM) network, an Enhanced Data GSM Environment (EDGE) network, and a Code Division Multiple Access (CDMA) network, and
   the 3G communication system comprises at least one network from among a Wideband-CDMA (W-CDMA) network and a Time Division-Synchronous CDMA (TD-SCDMA) network.

4. The method of claim 1, wherein an antenna resonance frequency of the second antenna includes a band of 1.7 GHz to 2.3 GHz.

5. The method of claim 1, wherein the second antenna transmits or receives a signal from at least one communication system from among a Long Term Evolution (LTE) communication system and a Time Division-Synchronous CDMA (TD-SCDMA) communication system.

6. The method of claim 1, wherein the first antenna is disposed at a lower portion of the electronic device that corresponds to a position at which a microphone of the electronic device is disposed, and
   the second antenna disposed at an upper portion of the electronic device that is opposite to the position at which a microphone of the electronic device is disposed.

7. The method of claim 1, wherein the
   the multi-communication service comprises one communication service from among a Simultaneous Voice and LTE (SVLTE) communication service and a Simultaneous GSM and LTE (SGLTE) communication service, and
   the single communication service comprises one communication service from among a 2G communication service, a 3G communication service, and a Circuit Switched Fall Back (CSFB) communication service.

8. An electronic device comprising:
a first antenna that transmits or receives a voice signal when providing a multi-communication service;
a second antenna that transmits or receives a data signal when providing the multi-communication service;
a first modem connected to the first antenna;
a second modem connected to the second antenna; and
one or more switches that connect the first and second antennas with the first and second modems,
wherein when the electronic device provides the multi-communication service, the one or more switches connect the first antenna with the first modem and the second antenna with the second modem, and
when the electronic device provides a single communication service, the one or more switches connect the first antenna with the second modem and wherein the first modem is configured to deactivate.

9. The electronic device of claim 8, wherein the first antenna operates at a resonance frequency in a band of 880 MHz to 960 MHz, a band of 1.7 GHz to 2.1 GHz, and a band of 2.6 GHz.

10. The electronic device of claim 8, wherein the first antenna transmits or receives a signal from at least one communication system from among a second Generation (2G) communication system, a third Generation (3G) communication system, and a Long Term Evolution (LTE) communication system, and
wherein the 2G communication system comprises at least one network from among a Global System for Mobile Communication (GSM) network, an Enhanced Data GSM Environment (EDGE) network, and a Code Division Multiple Access (CDMA) network, and
the 3G communication system comprises at least one network from among a Wideband-CDMA (W-CDMA) network and a Time Division-Synchronous CDMA (TD-SCDMA) network.

11. The electronic device of claim 8, wherein the second antenna operates at resonance frequency in a band of 1.7 GHz to 2.3 GHz.

12. The electronic device of claim 8, wherein the second antenna transmits or receives a signal from at least one communication system from among a Long Term Evolution (LTE) communication system and a Time Division-Synchronous CDMA (TD-SCDMA) communication system.

13. The electronic device of claim 8, wherein the first antenna is disposed at an lower portion of the electronic device that corresponds to a position at which a microphone of the electronic device is disposed, and
the second antenna is disposed at an upper portion of the electronic device, which is opposite to the position at which a microphone of the electronic device for voice communication is disposed.

14. The electronic device of claim 8, wherein the multi-communication service comprises one communication service from among a Simultaneous Voice and LTE (SVLTE) communication service and a Simultaneous GSM and LTE (SGLTE) communication service, and
the single communication service comprises one communication service from among a 2G communication service, a 3G communication service, and a Circuit Switched Fall Back (CSFB) communication service.

15. The electronic device of claim 8, wherein the one or more switches comprise:
a first switch being disposed between the first antenna and the first modem and connecting one of the first modem and the second modem with the first antenna; and
a second switch being disposed between the second antenna and the second modem and connecting one of the first antenna and the second antenna with the second modem.

16. The electronic device of claim 8, wherein the first modem processes a voice signal transmitted or received via the 2G communication system,
the second modem processes a voice signal or a data signal transmitted or received using at least one communication system from among the 2G communication system, the 3G communication system, and the Long Term Evolution (LTE) communication system,
the 2G communication system comprises at least one network from among a Global System for Mobile Communication (GSM) network, an Enhanced Data GSM Environment (EDGE) network, and a Code Division Multiple Access (CDMA) network, and
the 3G communication system comprises at least one network from among a Wideband-CDMA (W-CDMA) network and a Time Division-Synchronous CDMA (TD-SCDMA) network.

17. The electronic device of claim 8, further comprising a switch controller that controls operations of the one or more switches,
wherein the switch controller controls a connection of the one or more switches in order to connect the first antenna with the first modem and the second antenna with the second modem when the electronic device provides the multi-communication service, and controls the connection of the one or more switches to connect the first antenna with the first modem or the second modem when the electronic device provides a single communication service.

18. The electronic device of claim 8, wherein the when the electronic device provides the single communication service, a first communication interface connected to the first modem is configured to deactivate.

* * * * *

UNITED STATES PATENT AND TRADEMARK OFFICE
CERTIFICATE OF CORRECTION

PATENT NO. : 9,532,397 B2  
APPLICATION NO. : 14/633483  
DATED : December 27, 2016  
INVENTOR(S) : Doo-Hwan Lee et al.

Page 1 of 1

It is certified that error appears in the above-identified patent and that said Letters Patent is hereby corrected as shown below:

On the Title Page

Item (72), Line 5 should read as follows:  
--...Tae-Sin Song, Gyeonggi-do (KR)...--

In the Claims

Column 18, Claim 7, Lines 59-60 should read as follows:  
--...wherein the multi-communication service...--

Column 19, Claim 13, Line 46 should read as follows:  
--...at a lower portion...--

Column 20, Claim 18, Line 48 should read as follows:  
--...claim 8, wherein when the...--

Signed and Sealed this  
Fourteenth Day of February, 2017

Michelle K. Lee  
*Director of the United States Patent and Trademark Office*